US012784276B2

(12) United States Patent
Liu et al.

(10) Patent No.: US 12,784,276 B2
(45) Date of Patent: Nov. 3, 2026

(54) PROJECTION CALIBRATION METHOD AND PROJECTION CALIBRATION SYSTEM

(71) Applicant: DELTA ELECTRONICS, INC., Taoyuan City (TW)

(72) Inventors: Lai-Hsuan Liu, Taoyuan City (TW); Chung-Yi Yang, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 304 days.

(21) Appl. No.: 18/414,476

(22) Filed: Jan. 17, 2024

(65) Prior Publication Data

US 2024/0394920 A1 Nov. 28, 2024

Related U.S. Application Data

(60) Provisional application No. 63/504,445, filed on May 26, 2023.

(30) Foreign Application Priority Data

Sep. 6, 2023 (CN) ......................... 202311145247.8

(51) Int. Cl.
*H04N 9/31* (2006.01)
*G06T 7/80* (2017.01)
*H04L 9/40* (2022.01)

(52) U.S. Cl.
CPC ............ *G06T 7/80* (2017.01); *H04L 63/0428* (2013.01); *G06T 2207/30208* (2013.01)

(58) Field of Classification Search
CPC .. H04N 9/3185; H04N 9/3194; H04N 9/3179; H04N 9/3182; H04N 9/3147; G03B 21/147; G03B 21/145; G03B 21/142; G03B 21/14
See application file for complete search history.

(56) References Cited

U.S. PATENT DOCUMENTS

| | | | | |
|---|---|---|---|---|
| 10,931,850 | B2 | 2/2021 | Abuelsaad et al. | |
| 2007/0291184 | A1 | 12/2007 | Harville et al. | |
| 2009/0002637 | A1 * | 1/2009 | Harada ................ | H04N 9/3147 353/30 |
| 2011/0191037 | A1 * | 8/2011 | Oldham .................... | G01F 1/00 702/45 |
| 2011/0234896 | A1 | 9/2011 | Ivashin et al. | |
| 2013/0314388 | A1 | 11/2013 | Oda | |

(Continued)

FOREIGN PATENT DOCUMENTS

| | | | |
|---|---|---|---|
| CN | 103365481 | A | 10/2013 |
| CN | 107949836 | A | 4/2018 |

(Continued)

*Primary Examiner* — Ryan D Howard
(74) *Attorney, Agent, or Firm* — CKC & Partners Co., LLC

(57) ABSTRACT

A projection calibration method includes transmitting a calibration command to an edge node by a center node, acquiring a projection image of a test pattern image by the edge node, performing image processing on the acquired projection n image by the edge node based on the calibration command to get a calibration parameter data, transmitting the calibration parameter data to the center node by the edge node, and outputting a calibration result to a projector by the center node based on the calibration parameter data.

17 Claims, 9 Drawing Sheets

(56) References Cited

U.S. PATENT DOCUMENTS

| | | | | |
|---|---|---|---|---|
| 2015/0138042 | A1* | 5/2015 | Le Houerou .... | H04N 21/43615<br>345/1.3 |
| 2016/0259614 | A1 | 9/2016 | Liao | |
| 2017/0127032 | A1 | 5/2017 | Takahashi et al. | |
| 2019/0191134 | A1* | 6/2019 | Urano .................. | H04N 9/3147 |
| 2021/0099691 | A1 | 4/2021 | Danziger | |
| 2021/0195000 | A1* | 6/2021 | Yang ..................... | H04L 69/163 |
| 2021/0227172 | A1 | 7/2021 | Weisgerber | |

FOREIGN PATENT DOCUMENTS

| | | | |
|---|---|---|---|
| CN | 115861124 | A | 3/2023 |
| JP | 2014160998 | A | 9/2014 |
| TW | 201546535 | A | 12/2015 |
| TW | 202115478 | A | 4/2021 |

* cited by examiner

PROJECTION CALIBRATION METHOD AND PROJECTION CALIBRATION SYSTEM

CROSS-REFERENCE TO RELATED APPLICATION

This application claims priority to U.S. Provisional Application Ser. No. 63/504,445, filed May 26, 2023, and China Application Serial Number 202311145247.8, filed Sep. 6, 2023, the disclosures of which are incorporated herein by reference in their entireties.

BACKGROUND

Field of Invention

The present invention relates to a projection calibration method and a projection calibration system.

Description of Related Art

High resolution industrial camera, webcam, or single lens reflex camera are broadly utilized to acquire images in current projector calibration method. The high resolution images are then transmitted to a main processor for image processing, algorithm, parameter calculation, and projection output control, etc. Therefore, cost of image acquisition apparatus is high, the computation power requirement of the main process is huge, and it is time-consuming process and requires more labor work.

The method above is limited by venue, and therefore the camera cannot be installed conveniently. Or, the image transmission cable may be too long due to far or high installation position. Accordingly, image transmission interruption or graphic glitch problems may occur. Those problems may cause errors when the main processor performs analysis or image processing.

Accordingly, it is still a development direction for the industry to provide a projection calibration method and apparatus that can solve those problems.

SUMMARY

The invention provides a projection calibration method.

In one embodiment, the projection calibration method includes transmitting a calibration command to at least one edge node by a center node, acquiring a projection image of a test pattern image by the edge node, performing an image processing on the acquired projection image by the edge node based on the calibration command to get a calibration parameter data, transmitting the calibration parameter data to the center node by the edge node, and outputting a calibration result to a projector by the center node based on the calibration parameter data.

In one embodiment, the projection calibration method further includes controlling the projector to project the test pattern image by the center node, and projecting the test pattern image to a field of view of a camera of the edge node by the projector.

In one embodiment, the projection calibration method further includes encrypting the calibration parameter data before transmitting the calibration parameter data to the center node by the edge node.

In one embodiment, the projection calibration method further includes decrypting the encrypted calibration parameter data by the center node after transmitting the calibration parameter data to the center node by the edge node.

In one embodiment, the projection calibration method further includes splitting the calibration parameter data into multiple packages before transmitting the calibration parameter data to the center node by the edge node.

In one embodiment, outputting the calibration result to the projector by the center node based on the calibration parameter data further includes performing a calibration process based on the calibration parameter data by the center node to obtain the calibration result, and outputting the calibration result to the projector to make the projector project the calibrated image.

In one embodiment, a number of the at least one of the center node is plural, and performing the calibration process based on the calibration parameter data by the center nodes to obtain the calibration result further includes transmitting a mapping data between the center nodes.

In one embodiment, a number of the at least one projector is plural, and outputting the calibration result to the projectors to make the projectors project the calibrated image further includes that the projectors are configured to project at least one complete calibrated image, and multiple calibrated images are edge blended to form the complete calibrated image.

In one embodiment, a number of the at least one complete calibrated image is plural.

In one embodiment, transmitting the calibration parameter data to the center node by the edge node further includes transmitting an image and the calibration parameter data simultaneously.

In one embodiment, the image is a low resolution image or a compressed low capacity image.

In one embodiment, the projection calibration method further includes combining and encrypting the image and the calibration parameter data before transmitting the image and the calibration parameter data by the edge node.

The invention provides a projection calibration system configured to apply the projection calibration method.

In one embodiment, the projection calibration system includes at least one projector, at least one center node configured to transmit a calibration result to the at least one projector, and at least one edge node electrically connected with the projector and the center node. The edge node includes a camera, and the edge node is configured to perform image processing on the acquired projection image based on a calibration command.

In one embodiment, the edge node and the center node are disposed at the same mobile device.

In one embodiment, the edge node is disposed at a mobile device, and the center node is disposed in a processor control system or a mobile device.

In one embodiment, a number of the projector is plural.

In one embodiment, a number of the at least one center node is singular, and a number of the at least one edge node is plural.

In one embodiment, a number of the at least one center node is singular, and a number of the at least one edge node is singular.

In one embodiment, a number of the at least one center node is plural, and a number of the at least one edge node is singular.

In one embodiment, a number of the at least one center node is plural, and a number of the at least one edge node is plural.

In the aforementioned embodiments, the projection calibration method uses widespread and portable mobile device to acquire a projection image of a test pattern image. Time and money for installing cameras and cables can be omitted so as to reduce projection calibration time and reduce cost, and avoid venue limitation due to installation of the image acquisition apparatus and cables. There is no need to perform image processing directly on a high resolution image by the center node. Instead, the edge node is used to perform image processing and edge computation on the acquired projection image. Therefore, the amount of data needs to be computed and processed by the center node can be reduced, the amount of data needs to be transmitted from camera to main processor is also reduced, and stability of data transmission is increased. There is no need to consider image interruption or graphic glitch problems caused by the transmission instability due to high resolution image transmission in a long time period. Since only the calibration parameter data and low resolution images are required to be transmitted, the amount of data needs to be transmitted can be reduced and transmission delay can be reduced.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
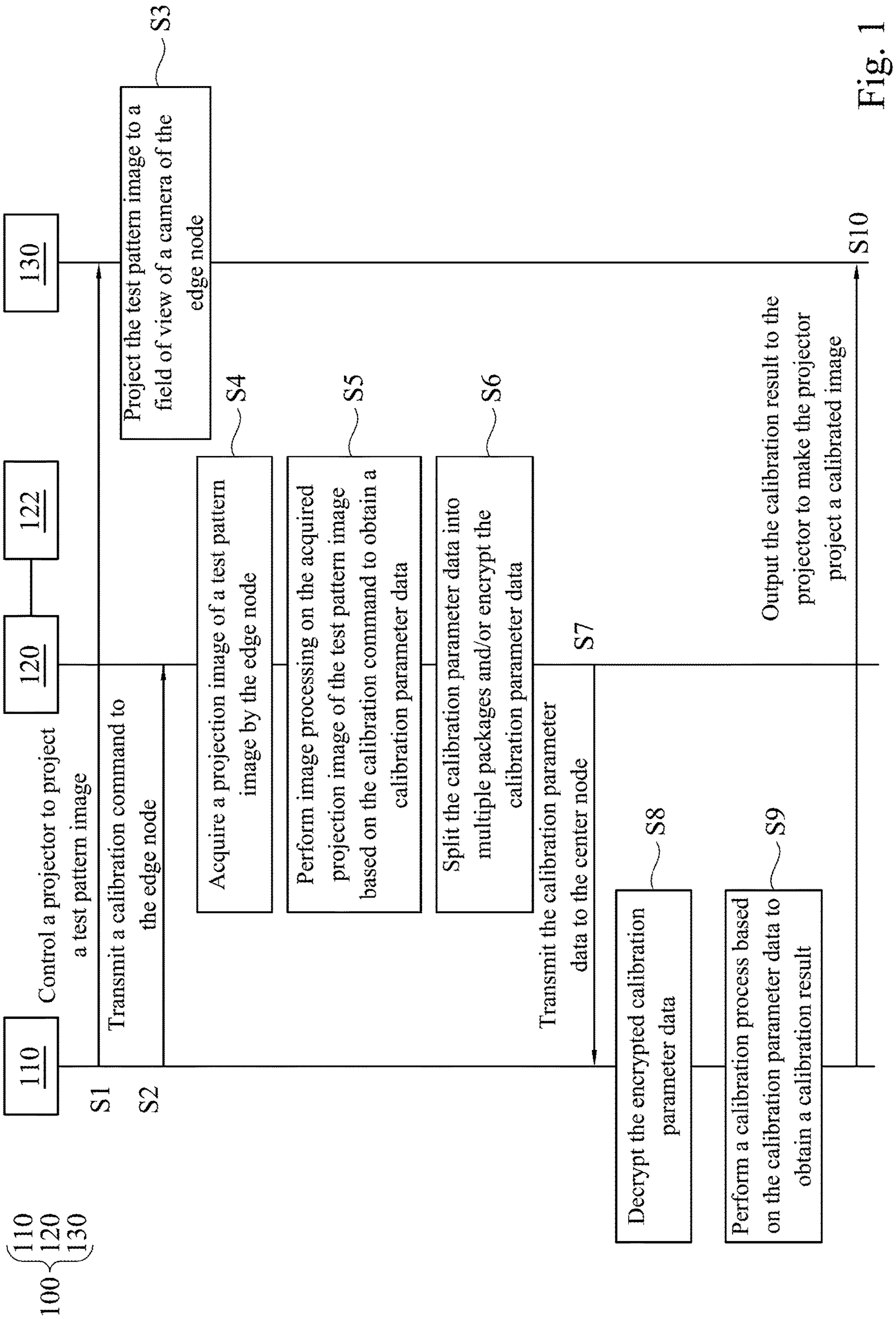
FIG. 1 is a flow chart of a projection calibration method according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a flow chart of a projection calibration method according to one embodiment of the present disclosure. The projection calibration method is performed by a projection calibration system 100. The projection calibration system 100 includes a center node 110, an edge node 120, and a projector 130. The numbers of the center node 110, the edge node 120, and the projector 130 can be singular or plural. Various configurations of projectors will be described in details in the following paragraphs.

The center node 110 can be a processor control system or a mobile device. The processor control system is, for example, a computer. The mobile device includes smart phone, tablet computer, raspberry Pi, and Rock Pi, or any single board computer (SBC), etc., but the present disclosure is not limited thereto. The center node 110 includes a transmission device, such as Bluetooth, WIFI, wired transmission device, a wireless transmission device, and a processor, a display screen, and a power supply. The center node 110 can include a camera or not.

The edge node 120 is a mobile device, such as smart phone, tablet computer, raspberry Pi, and Rock Pi, etc., but the present disclosure is not limited thereto. The edge node 120 includes transmission device, such as Bluetooth, WIFI, wired transmission device, a wireless transmission device, and a processor, a display screen, a power supply, and a camera 122.

A specific application (APP) needs to be installed in the device used as the edge node 120 to perform an edge computation in the projection calibration method. The edge computation means an image processing performed to the images acquired by the camera 122 through the edge node 120. A system that utilized the edge node 120 to perform edge computation is a distributed system, which can reduce the amount of data needs to be computed by the center node 110 and the amount of data needs to be transmitted, and increase stability of data transmission.

The projection calibration method starts at step S1, of which the center node 110 controls the projector 130 to project the test pattern image. The projection calibration method continues to step S3, of which the projector 130 projects the test pattern image to a field of view of the camera 122 of the edge node 120. The projection calibration method continues to step S2, of which the center node 110 transmits a calibration command to the edge node 120. The calibration command includes parameters that need to be computed from the acquired projection image of a test pattern image and data for edge computation. Step S2 and step S3 can be operated simultaneously, and the sequence has no limitation.

The projection calibration method continues to step S4, of which the edge node 120 acquires the projection image of a test pattern image. The projection image of a test pattern image can be acquired by the built-in camera 122 in the mobile device where the edge node 120 is disposed, and there is no extra image acquisition apparatus needed. In other words, comparing to the conventional high resolution image acquisition apparatus such as industrial camera, webcam, or single lens reflex camera, the projection calibration method of the present disclosure use widespread and portable mobile device to acquire the projection image of test pattern image. Time and money for installing cameras and cables can be omitted so as to reduce projection calibration time and reduce cost.

The projection calibration method continues to step S5, of which the edge node 120 perform image processing on the acquired projection image of the test pattern image based on the calibration command to get a calibration parameter data. The image processing is performed by the application in the edge node 120, and the calibration parameter data is obtained from the projection image of the test pattern image acquired by the camera 122. The high resolution or high capacity images acquired by the conventional industrial camera needs to be transmitted to the processor, such that the image processing can be performed and calibration data can be computed. There is no need to perform image processing directly on the high resolution image by the center node 110 in step S5 of the present disclosure. Instead, the edge node 120 is used to perform edge computation on the acquired projection images locally without image transmission, and the amount of data needs to be computed and processed by the center node 110 can be reduced. In addition, the projection calibration method can avoid venue limitation due to installation of the image acquisition apparatus and cables, and there is no need to consider image interruption or graphic glitch problems caused by the transmission instability due to high resolution image transmission in a long time period.

Items of the projection calibration can include geometry calibration, color temperature calibration, or color calibration, etc., but the present disclosure is not limited thereto. In various embodiments, the calibration parameter data can include one or multiple calibration items.

Take the geometry calibration as an example, the test pattern image can include an array formed by circular bright spots. In step S2, the calibration command transmitted by the center node 110 includes a threshold needs to be calculated during the image processing, and enables the edge node 120 to perform binary and segmentation operations on the acquired projection image of the test pattern image in step S5. Subsequently, after find out the parameters of center coordinates of the circular bright spots and radius, find out characteristic points. The characteristic points are the calibration parameter data necessary for the geometry calibration.

Take the color calibration as an example, the test pattern image can be a block with single color. In step S2, the calibration command transmitted by the center node 110 includes a threshold needs to be calculated during the image processing, and enables the edge node 120 to perform binary and segmentation operations on the acquired projection image of the test pattern image in step S5. Subsequently, a color average value is calculated by the edge node 120. The color average value is the calibration parameter data necessary for the color calibration.

Take the color temperature calibration as an example, the test pattern image can be a full white image. The edge node 120 acquires the projection image of the test pattern projected by a color temperature calibrated projector 130, and a color temperature value is calculated and stored in the edge node 120. In step S4 and step S5, the edge node 120 acquires a test image pattern projected by a projector 130 without calibration and performs the image processing. Steps of the image processing are similar to the steps of the color calibration. A color temperature value is calculated from a region of interest (ROI) by the edge node 120. The color temperature value is the calibration parameter data necessary for the color temperature calibration.

The projection calibration method continues to step S6, of which the calibration parameter data is split as multiple packages and/or encrypts the calibration parameter data. The step S6 can be operated alternatively based on practical requirement.

For example, in some embodiments, the parametric data which is AES128 encrypted and combined with checksum. When the amount of the calibration parameter data is larger than the limit of a single package, the calibration parameter data is split into multiple packages. In some embodiments, the calibration parameter data can be combined with low resolution image or compressed low-capacity image and then be transmitted together. In such embodiment, the calibration parameter data and the image data are AES128 encrypted after being combined.

The projection calibration method continues to step S7, of which the calibration parameter data is transmitted to the center node 110 by the edge node 120. Since only the calibration parameter data and low resolution images are required to be transmitted, the amount of data needs to be transmitted can be reduced and transmission delay can be reduced.

Since the calibration parameter data is encrypted before being transmitted to the center node 110, data security is improved. It is beneficial for remote data collection by means of performing the edge computation through the edge node 120, such that the data transmission and analysis time by the center node 110 is reduced, possibility of data transmission termination due to network interruption is reduced, and data transmission stability is increased.

The projection calibration method continues to step S8, of which the encrypted calibration parameter data is decrypted by the center node. The step S8 can be operated alternatively based on practical requirement. If the step S6 aforementioned is operated, the encrypted calibration parameter data is AES128 decrypted in step S8.

The projection calibration method continues to step S9, the center node 110 performs the calibration process based on the calibration parameter data to obtain the calibration result. Take the geometry calibration as an example, the center node 110 can compute homography and projection screen vectors based on the corresponding characteristic points obtained by the edge node 120 to establish a mapping relation between the camera image coordinates and the projector coordinates, or a mapping relation between multiple camera image coordinates and multiple projector coordinates. When the number of the center nodes 110 is plural, the center nodes 110 can transmit a mapping data therebetween. After calibration operation, the center nodes 110 can obtain a calibration result.

The projection calibration method continues to step S10, the calibration result is output to the projector 130 by the center node, such that the projector 130 can project a calibrated image. When a number of the projector 130 is plural, multiple calibrated images can be edge blended to form a complete calibrated image. When the number of the projector 130 is singular, the calibrated image is the complete calibrated image. The complete calibrated images projected from the same projection calibration apparatus can be a single image (such as the embodiment in FIG. 3) or multiple independent images (such as the embodiment in FIG. 5).

Figure 2:
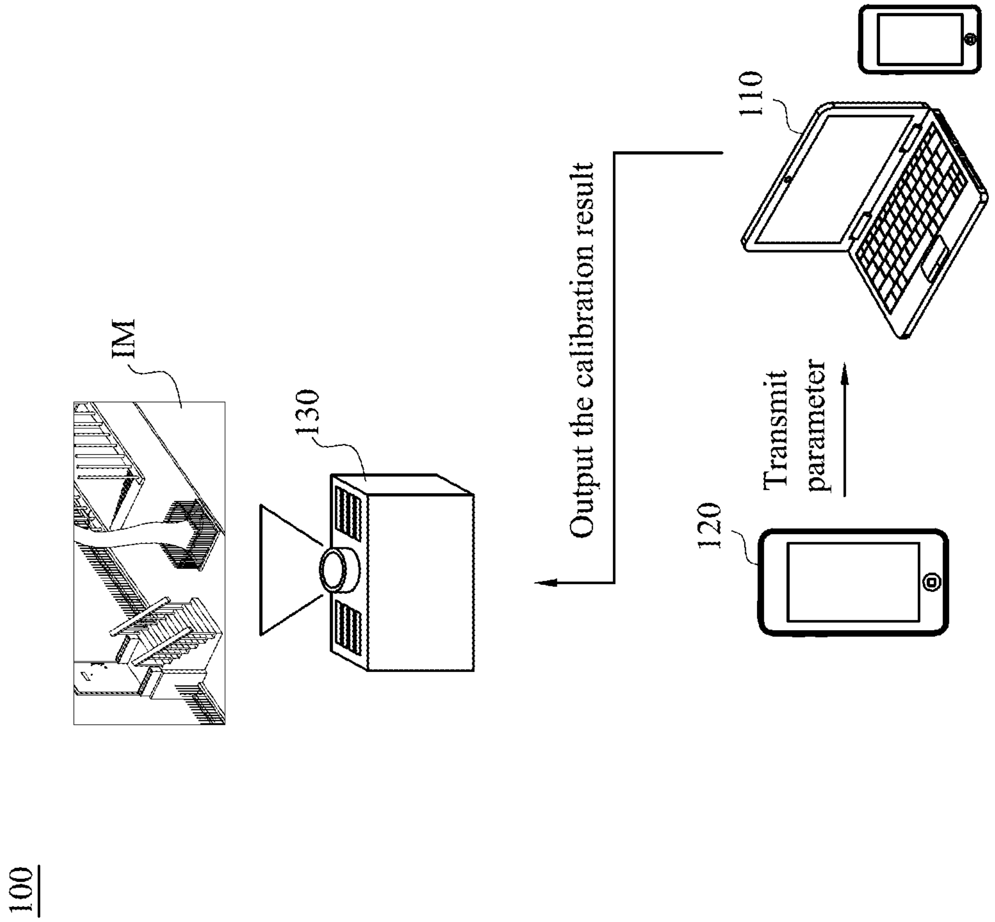
FIG. 2 is a schematic of a projection calibration system according to one embodiment of the present disclosure.

FIG. 2 is a schematic of a projection calibration system 100 according to one embodiment of the present disclosure. The projection calibration system 100 includes a center node 110, an edge node 120, and one projector 130. The center node 110 is a processor control system or mobile device, and the edge node 120 is a mobile device. The edge node 120 is electrically connected with the projector 130 and the center node 110 such as WIFI. The edge node 120 has a built-in camera 122 (see FIG. 1) configured to perform image processing on a projection image of the test pattern image acquired by the camera 122. The edge node 120 transmits calibration parameter data (that is the step S7 in FIG. 1) to the center node 110. The center node 110 outputs the calibration result (that is the step S10 in FIG. 1) to the projector 130. The projector 130 projects a complete calibrated image IM.

Figure 3:
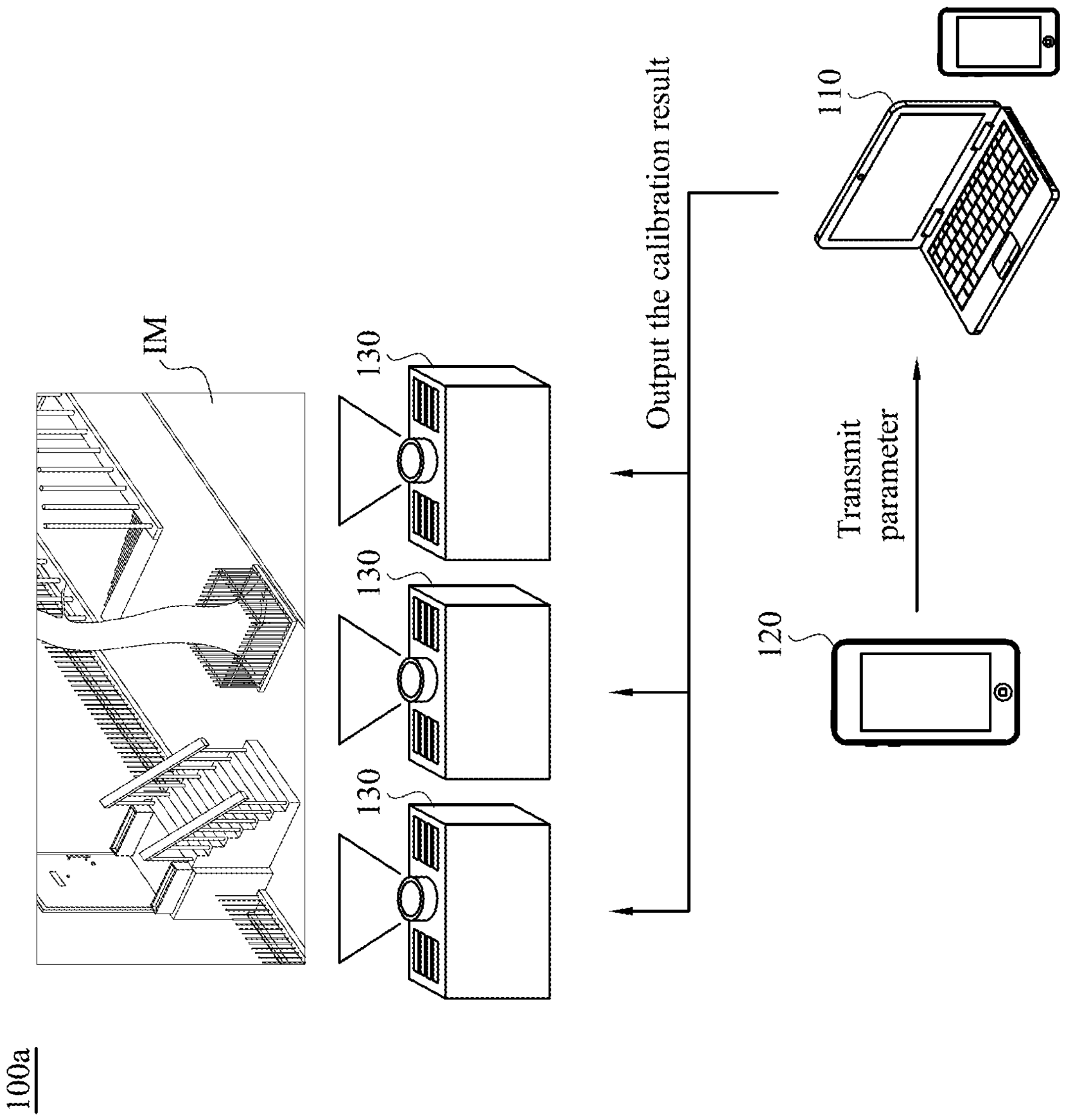
FIG. 3 is a schematic of a projection calibration system according to another embodiment of the present disclosure.

FIG. 3 is a schematic of a projection calibration system 100*a* according to another embodiment of the present disclosure. The projection calibration system 100*a* is similar to the projection calibration system 100 in FIG. 2, and the difference is that the projection calibration system 100*a* has multiple projectors 130, and three projectors 130 are demonstrated herein. The center node 110 outputs the calibration result to three projectors 130 respectively. The projectors 130 respectively project corresponding images which are edge blended to form a complete calibrated image IM.

Figure 4:
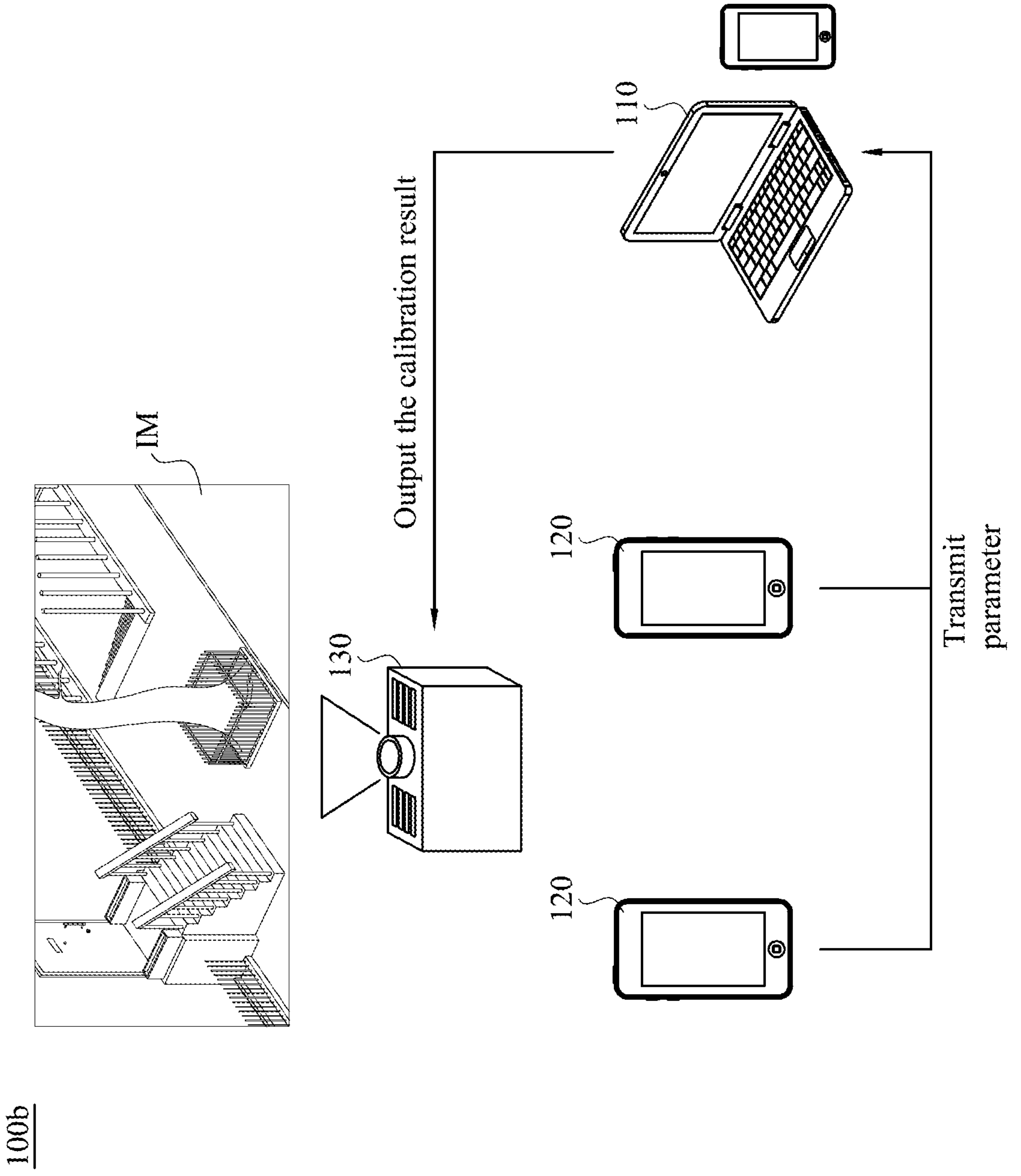
FIG. 4 is a schematic of a projection calibration system according to another embodiment of the present disclosure.

FIG. 4 is a schematic of a projection calibration system 100*b* according to another embodiment of the present disclosure. The projection calibration system 100*b* is similar to the projection calibration system 100 in FIG. 2 and the difference is that the projection calibration system 100*b* has multiple edge nodes 120, and two edge nodes 120 are demonstrated herein. These two edge nodes 120 perform edge computation respectively and transmit the calibration parameter data to the same center node 110.

Figure 5:
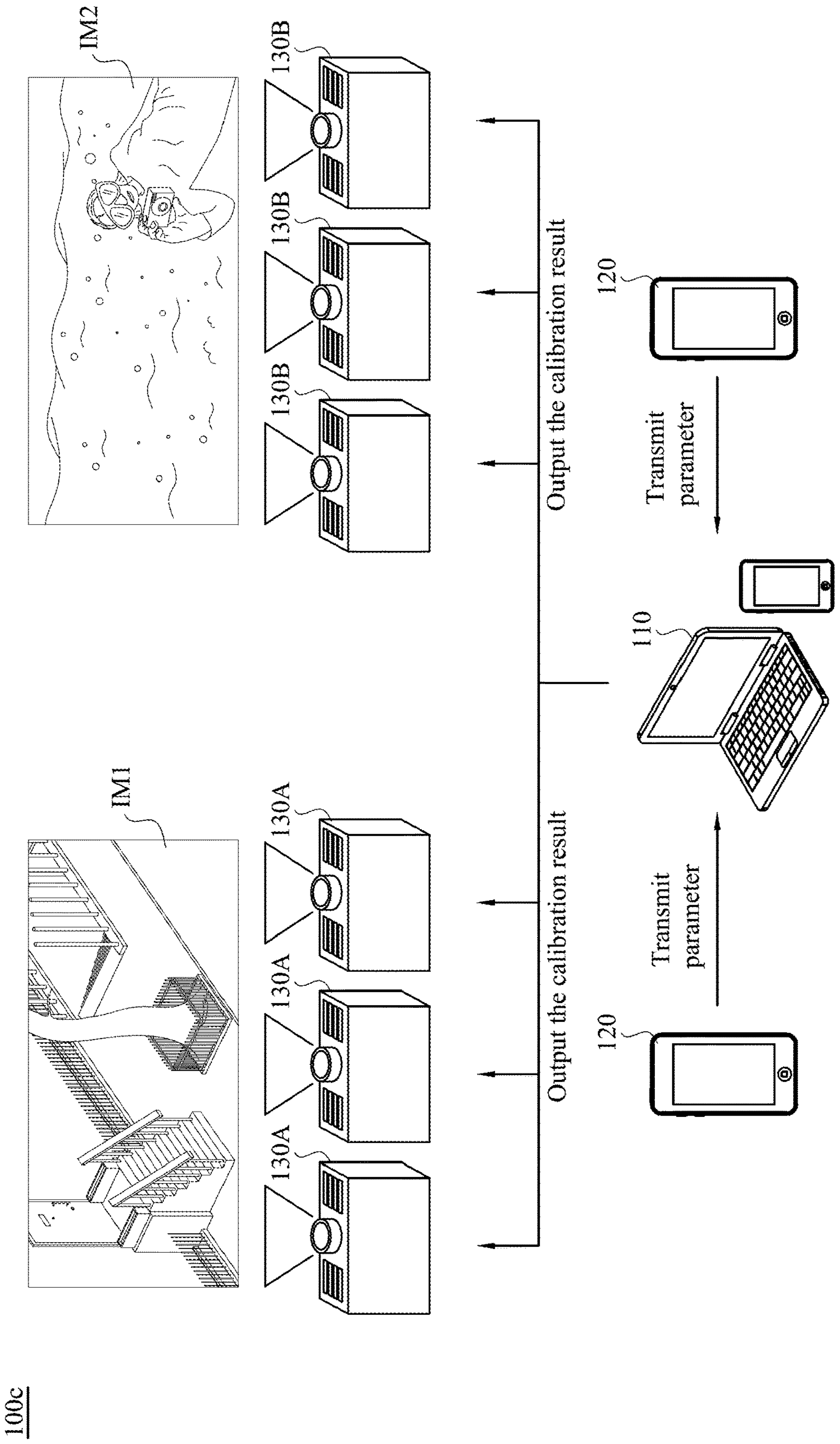
FIG. 5 is a schematic of a projection calibration system according to another embodiment of the present disclosure.

FIG. 5 is a schematic of a projection calibration system 100*c* according to another embodiment of the present disclosure. The projection calibration system 100*c* is similar to the projection calibration system 100*b* in FIG. 4 and the difference is that the projection calibration system 100*c* has multiple projectors 130A, 130B, and six projectors are demonstrated herein. The projectors 130A are configured to project a first complete calibrated image IM1, and the other three projectors 130B are configured to project a second complete calibrated image IM2. The first complete calibrated image IM1 and the second first complete calibrated image IM2 are independent and are edge blended images. In other words, multiple projectors 130A, 130B can be used to form single one complete calibrated image IM and can be used to form several independent complete calibrated images IM through image edge blending.

Figure 6:
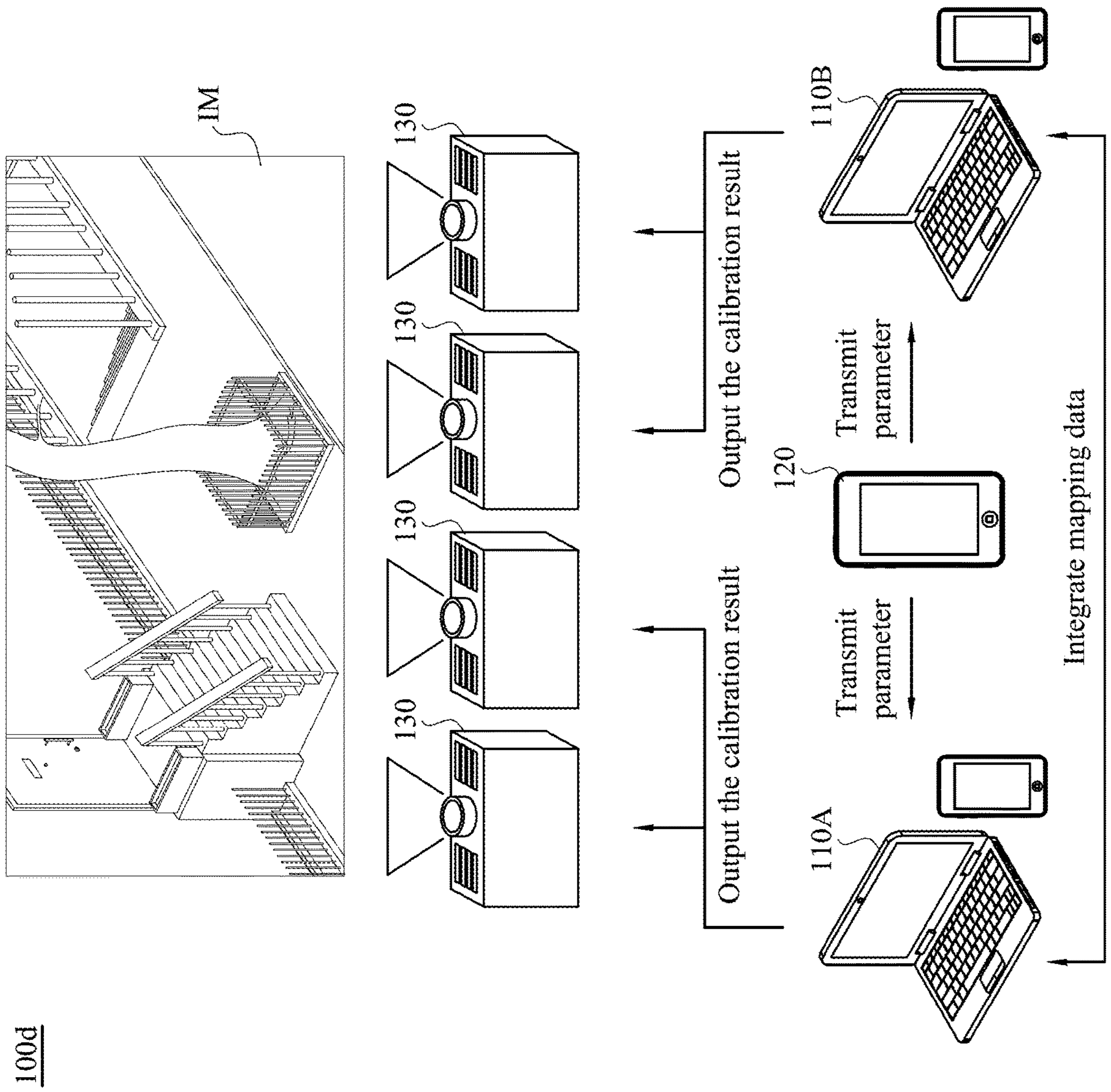
FIG. 6 is a schematic of a projection calibration system according to another embodiment of the present disclosure.

FIG. 6 is a schematic of a projection calibration system 100*d* according to another embodiment of the present disclosure. The projection calibration system 100*d* is similar to the projection calibration system 100*a* in FIG. 3 and the difference is that the projection calibration system 100*d* includes multiple center nodes 110A, 110B, and two center nodes are demonstrated herein. The projection calibration system 100*d* includes four projectors 130, and the center nodes 110A, 110B each corresponds to two projectors 130. The edge node 120 performs edge computation and transmits calibration parameter data to two center nodes 110A, 110B, respectively. Two center nodes 110A, 110B can transmit mapping data after calibration process such that multiple projectors 130 projects images to form a complete calibrated image IM through image edge blending. In other embodiments, multiple projectors 130 can project several independent complete calibrated images IM as shown in FIG. 5.

Figure 7:
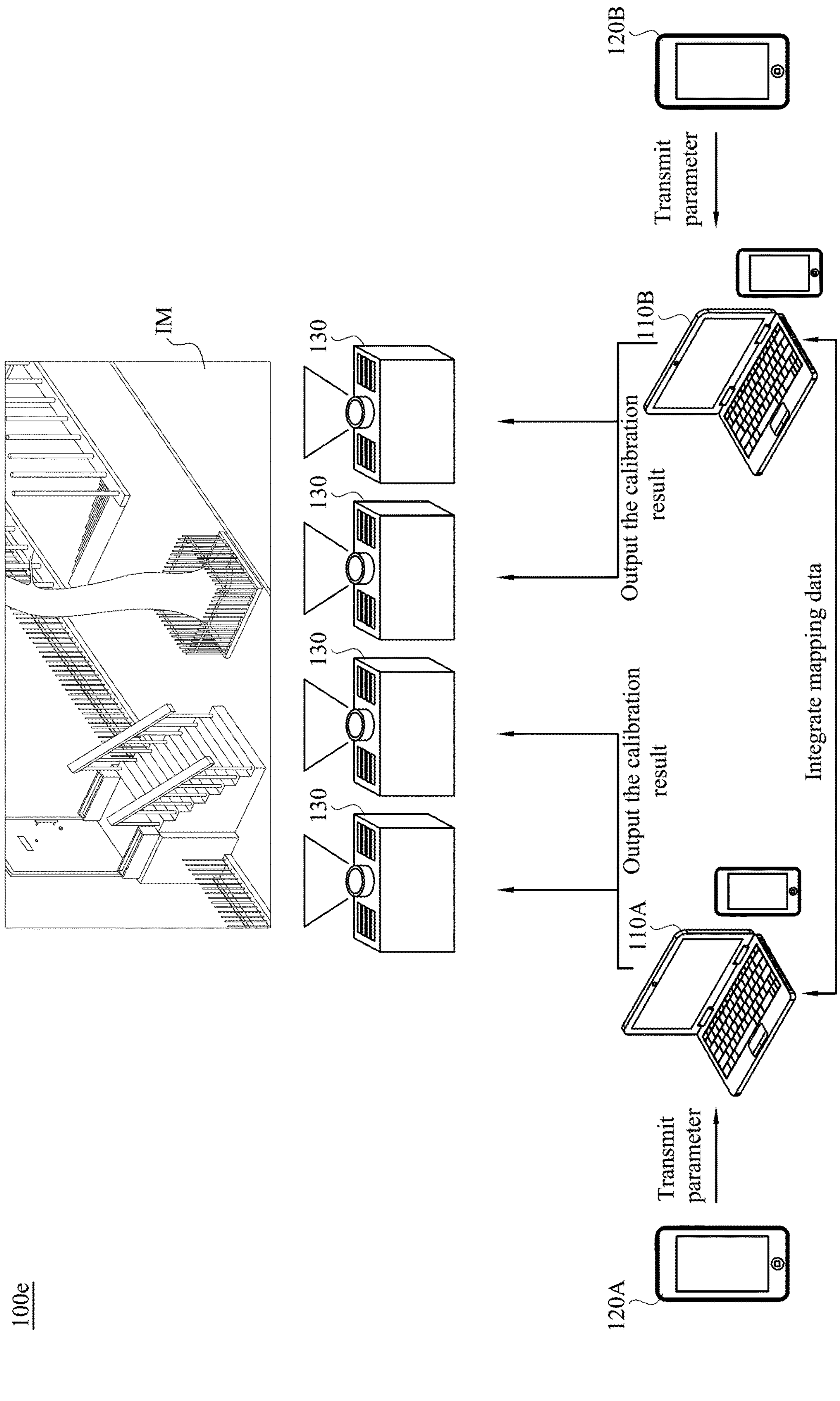
FIG. 7 is a schematic of a projection calibration system according to another embodiment of the present disclosure.

FIG. 7 is a schematic of a projection calibration system 100*e* according to another embodiment of the present disclosure. The projection calibration system 100*e* is similar to the projection calibration system 100*d* in FIG. 6 and the difference is that the projection calibration system 100*e* includes multiple edge nodes 120A, 120B, and two edge nodes are demonstrated herein. The edge nodes 120A, 120B correspond to the center nodes 110A, 110B, respectively. Multiple projectors 130 project images to form a complete calibrated image IM through image edge blending. In other embodiments, multiple projectors 130 can project several independent complete calibrated images IM as shown in FIG. 5.

Figure 8:
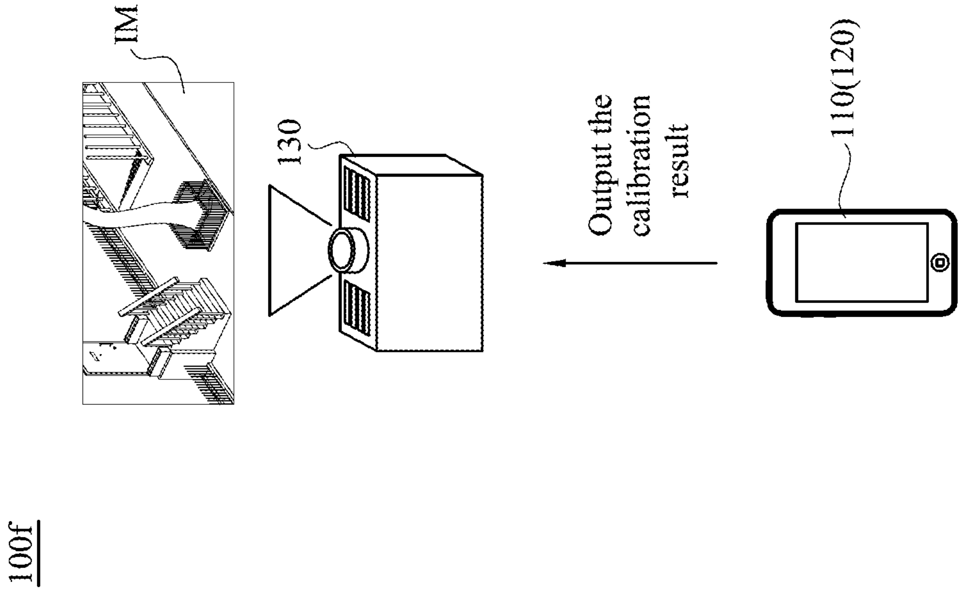
FIG. 8 is a schematic of a projection calibration system according to another embodiment of the present disclosure.

FIG. 8 is a schematic of a projection calibration system 100*f* according to another embodiment of the present disclosure. The projection calibration system 100*f* includes a center node 110 and an edge node 120 in the same mobile device. The mobile device outputs the calibration result to single one (or multiple) projector 130.

Figure 9:
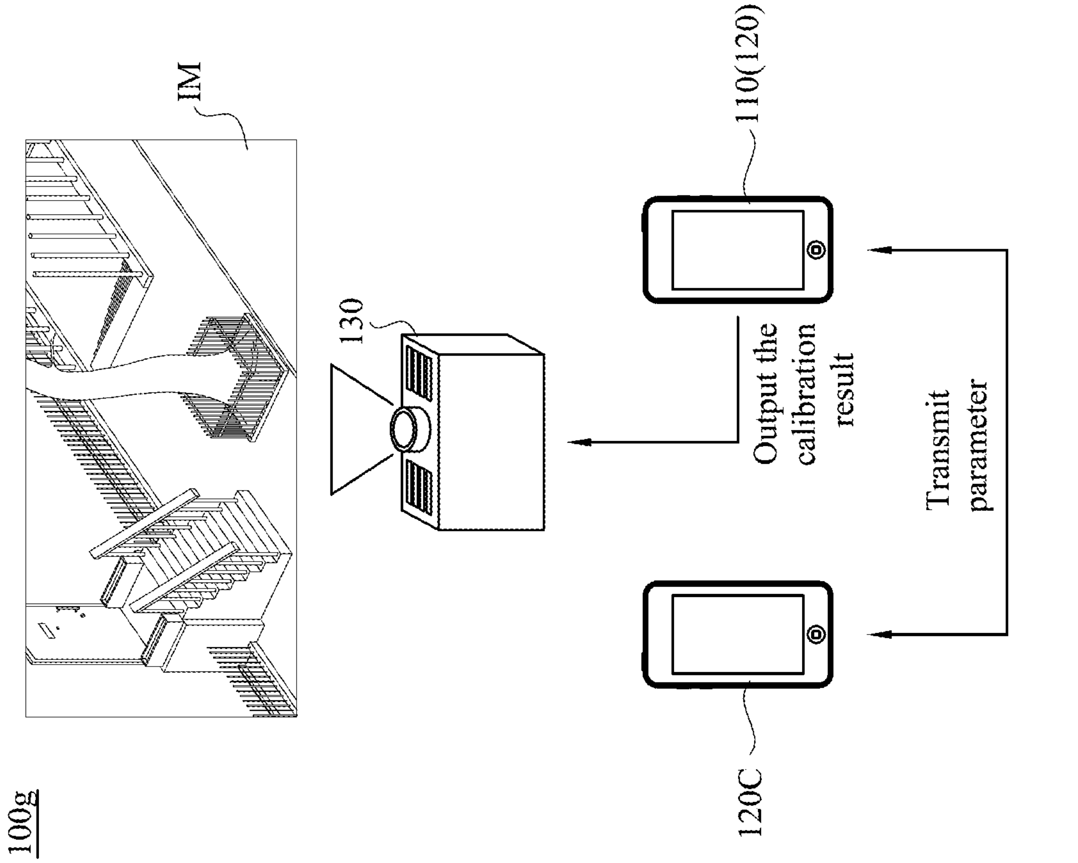
FIG. 9 is a schematic of a projection calibration system according to another embodiment of the present disclosure.

FIG. 9 is a schematic of a projection calibration system 100*g* according to another embodiment of the present disclosure. The projection calibration system 100*g* includes a center node 110 and an edge node 120 at the same mobile device, and another edge node 120C at another mobile device. The edge node 120 and the edge node 120C both can perform edge computation. The edge node 120 transmits calibration parameter data to the center node 110. The center node 110 performs the calibration process based on the calibration parameter data from the edge node 120 and the edge node 120C and then output the calibration result to single one (or multiple) projector 130.

The projection calibration systems shown in FIG. 2 to FIG. 9 above have the same advantages as the projection calibration systems in FIG. 1, and the description are not repeated hereinafter. Advantages of using the projection calibration systems and projection calibration method will be described through practical cases.

Table 1 is a projection calibration system analysis table of conventional projection calibration apparatuses and the projection calibration system of the present patent. Multiple edge nodes, multiple center nodes and 15 projectors are used as example in Table 1, and are applied in large scene such as a screen with width 50 m and height 3 m. Regarding the conventional projection calibration apparatus 1, 2, multiple computers, industrial cameras and cables need to be installed. Regarding the projection calibration system of the present patent, a computer is installed or a mobile device is used. Therefore, the conventional projection calibration apparatus 1, 2 take about 1~2 hours to install apparatus without delay, or take 1~3 days at most. In the projection calibration apparatus of the present patent, only installation of App in the mobile device having the edge node and setting smartphone camera through tripod are required, which takes less than 10 minutes.

TABLE 1

Projection Calibration System Analysis Table

| Items | Conventional Projection Calibration Apparatus 1 (not Wide-Field Camera) | Conventional Projection Calibration Apparatus 2 (Wide-Field Camera) | Present Patent Projection Calibration System |
|---|---|---|---|
| Computer | 3 | 3 | 0 |
| Industrial Camera | 5 | 3 | 0 |
| Power Socket | 6<br>need extra construction | 6<br>need extra construction | 0 |
| Cable | 6<br>5(not Wide-Field Camera) | 6<br>3(not Wide-Field Camera) | 0 |
| Keyboard and mouse | 3 | 3 | 0 |
| Tripod | 5 | 3 | 5 |
| Wide-angle lens | No | 3 | No |
| Smartphone | 0 | 0 | 5 |
| Network Equipment | | 2 groups | |

Table 2 is a projection calibration system analysis table of conventional projection calibration methods and the projection calibration method of the present patent. In the conventional projection calibration method 1, 2, high-resolution images acquired by industrial cameras need to be transmitted. Therefore, there are possibilities of image transmission delay or fail. In the projection calibration system of the present patent, only calibration parameter data and/or low resolution image need to be transmitted. Therefore, the amount of data needs to be transmitted in the conventional projection calibration method is far more than the amount of data needs to be transmitted in the present disclosure.

Since the camera in the conventional projection calibration method has no computation function, the images are processed after being transmitted to the processor. Take 1080P resolution as an example, transmission time is about 6 seconds. On the contrary, it takes 0.001 second to perform edge computation by the edge node and transmit the calibration parameter data to the center node. Take the geometry calibration as an example, characteristic catching may fail due to the 6 seconds delay of the transmission time in the conventional projection calibration method.

TABLE 2

Projection Calibration System Performance Analysis Table

| Items | Conventional method 1 (not Wide-Field Camera) | Conventional method 2 (Wide-Field Camera) | Present Patent Projection Calibration System |
|---|---|---|---|
| High-resolution Image transmission | YES | YES | NO |
| Image transmission Delay | YES | YES | NO |
| Transmission fail or calibration fail due to poor Net | YES | YES | NO |
| Image data process by each processor | 1.7 | 1 | 1 |
| Calibration Precision | GOOD | POOR | GOOD |
| Camera resolution (1920 × 1080 × 3 uncompressed RGB image) | GOOD | POOR (based on the magnitude) | GOOD |
| Data capacity of each image data | Image/slice About 6.2E7 bytes | Image/slice About 62 MBps | Calibration parameters About 5000 byte |
| Extra sensor requirement | NO | NO | Lidar/ Gyroscope |
| Carry difficulty | HARD | HARD | EASY |
| Socket limit | YES | YES | NO |
| Extra program installed for image acquisition | YES | YES | YES |

Table 3 is an efficiency comparison of conventional projection calibration methods and the projection calibration method of the present patent. Take the processors containing the center nodes 110A, 110B, and 110C as example, it needs three persons to control each processor in the conventional projection calibration methods 1, 2, and each processor controls the calibration process of one of the projectors. It takes about two hours for image processing and switching computers to integrate mapping data of different projectors in the calibration process. In the projection calibration method of the present patent, multiple edge nodes are used to transmit calibration parameter data from three projectors to the center node. The center node can process the mapping data of the projectors in the calibration process. Therefore, it requires only one person and takes about one hour to control the center node to output the calibration result.

TABLE 3

Projection Calibration System Efficiency Comparison Table

| Items | Conventional projection calibration method (not Wide-Field Camera) | Present Patent Projection Calibration Method |
|---|---|---|
| Step 1 | Calibrate the projector of the Center node 110A | The center node transmit characteristic data of each projector to each edge node |
| Step 2 | Calibrate the projector of the Center node 110B | The edge node transmits processed characteristic data to the center node |
| Step 3 | Calibrate the projector of the Center node 110C | Center node output calibration result |
| Step 4 | Integrate projector Mapping data | — |
| Step 5 | Output calibration data | — |

In other embodiments, when the projector is used in special scene, the position for image calibration may be too high such that the tripod cannot be setup to reach the position. Since the mobile device used as an edge node can be conveniently carried, it can be carried by an unmanned aerial vehicle (UAV) so as to overcome limitation of site.

In summary, the projection calibration method use widespread and portable mobile device to acquire the test pattern image. Time and money for installing cameras and cables can be omitted so as to reduce projection calibration time and reduce cost, and avoid venue limitation due to installation of the image acquisition apparatus and cables. There is no need to perform image processing directly on the high resolution image by the center node. Instead, the edge node is used to perform edge computation locally on the acquired images, and therefore the amount of data needs to be processed and computed by the center node can be reduced, the amount of data needs to be transmitted is reduced, and stability of data transmission is increased. There is no need to consider image interruption or graphic glitch problems caused by the transmission instability due to high resolution image transmission in a long time period. Since only the calibration parameter data and low resolution images are required to be transmitted, the amount of data needs to be transmitted can be reduced and transmission delay can be reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projection calibration method, comprising:

transmitting a calibration command to at least one edge node by at least one center node;

acquiring a projection image of a test pattern image by the edge node;

performing image processing on the acquired projection image by the edge node based on the calibration command to get a calibration parameter data;

transmitting the calibration parameter data to the center node by the edge node; and outputting a calibration result to a plurality of first projectors and a plurality of second projectors by the center node based on the calibration parameter data, wherein the first projectors are configured to project a first complete calibrated image that is an edge blended image, the second projectors are configured to project a second complete calibrated image that is another edge blended image, and the first complete calibrated image and the second complete calibrated image are independent.

2. The projection calibration method of claim 1, further comprising:

controlling the first projectors and the second projectors to project the test pattern image by the center node; and projecting the test pattern image to a field of view of a camera of the edge node by the first projectors and the second projectors.

3. The projection calibration method of claim 1, further comprising:

before transmitting the calibration parameter data to the center node by the edge node, encrypting the calibration parameter data by the edge node.

4. The projection calibration method of claim 3, further comprising:

after transmitting the calibration parameter data to the center node by the edge node, decrypting the encrypted calibration parameter data by the center node.

5. The projection calibration method of claim 1, further comprising:

before transmitting the calibration parameter data to the center node by the edge node, splitting the calibration parameter data into a plurality of packages.

6. The projection calibration method of claim 1, wherein outputting the calibration result to the first projectors and the second projectors by the center node based on the calibration parameter data further comprises:

performing a calibration process based on the calibration parameter data by the center node to obtain the calibration result; and outputting the calibration result to the first projectors and the second projectors to make the first projectors and the second projectors project a calibrated image.

7. The projection calibration method of claim 6, wherein a number of the at least one of the center node is plural, and performing the calibration process based on the calibration parameter data by the center nodes to obtain the calibration result further comprises:

transmitting a mapping data between the center nodes.

8. The projection calibration method of claim 1, wherein transmitting the calibration parameter data to the center node by the edge node further comprising:

transmitting an image and the calibration parameter data simultaneously.

9. The projection calibration method of claim 8, wherein the image is a low resolution image or a compressed low capacity image.

10. The projection calibration method of claim 8, further comprising:

before transmitting the image and the calibration parameter data by the edge node, combining and encrypting the image and the calibration parameter data.

11. A projection calibration system, configured to apply the projection calibration method in claim 1, wherein the projection calibration system comprises:

a plurality of first projectors and a plurality of second projectors, wherein the first projectors are configured to project a first complete calibrated image that is an edge blended image, the second projectors are configured to project a second complete calibrated image that is another edge blended image, and the first complete calibrated image and the second complete calibrated image are independent;

at least one center node configured to transmit a calibration result to the first projectors and the second projectors; and at least one edge node electrically connected with the first projectors and the second projectors and the center node, wherein the edge node comprises a camera, the edge node is configured to perform image processing on the acquired projection image based on a calibration command.

12. The projection calibration system of claim 11, wherein the edge node and the center node are disposed at the same mobile device.

13. The projection calibration system of claim 11, wherein the edge node is disposed at a mobile device, and the center node is disposed in a processor control system or a mobile device.

14. The projection calibration system of claim 11, wherein a number of the at least one center node is singular, and a number of the at least one edge node is plural.

15. The projection calibration system of claim 11, wherein a number of the at least one center node is singular, and a number of the at least one edge node is singular.

16. The projection calibration system of claim 11, wherein a number of the at least one center node is plural, and a number of the at least one edge node is singular.

17. The projection calibration system of claim 11, wherein a number of the at least one center node is plural, and a number of the at least one edge node is plural.

* * * * *